(No Model.)
E. W. ROSS, Dec'd.
M. F. Ross, Executrix.
SAFETY DRIVING MECHANISM.
No. 504,479. Patented Sept. 5, 1893.
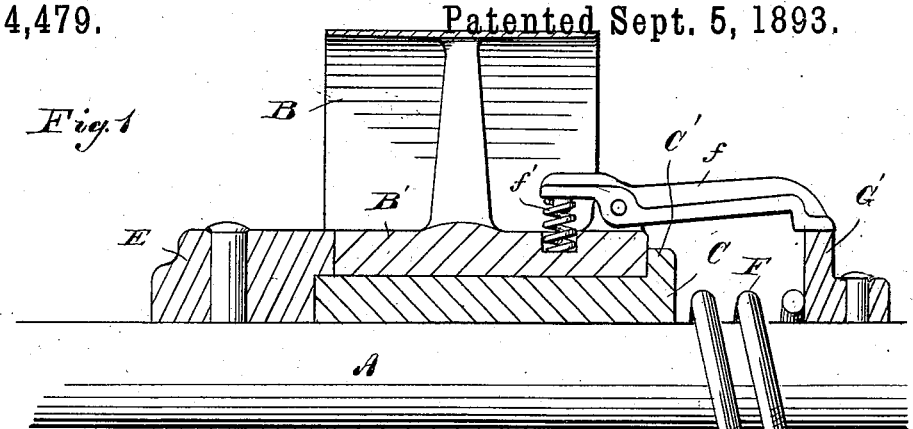
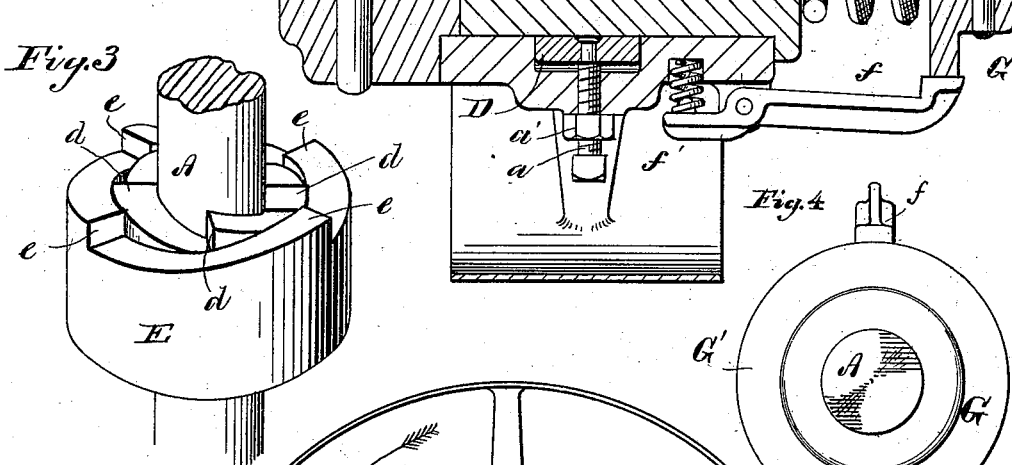
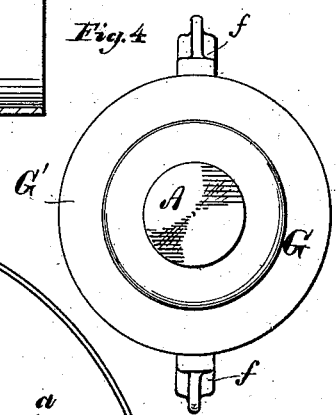
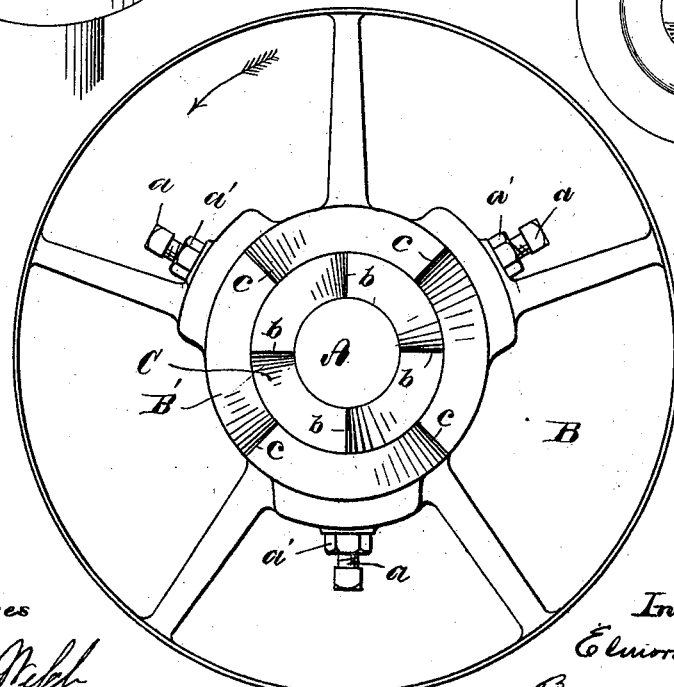
Witnesses
Chas. O. Welch.
A. L. Clarke
Inventor
Elmore W. Ross
By Saml. A. Staley
Atty.

UNITED STATES PATENT OFFICE.

ELMORE W. ROSS, OF SPRINGFIELD, OHIO; MARY F. ROSS EXECUTRIX OF SAID ELMORE W. ROSS, DECEASED.

SAFETY DRIVING MECHANISM.

SPECIFICATION forming part of Letters Patent No. 504,479, dated September 5, 1893.

Application filed August 30, 1889. Serial No. 322,456. (No model.)

*To all whom it may concern:*

Be it known that I, ELMORE W. ROSS, a citizen of the United States, residing at Springfield, in the county of Clark and State of Ohio, have invented certain new and useful Improvements in Safety Driving Mechanism, of which the following is a specification.

My invention relates to improvements in safety devices in connection with driving mechanism operating machinery.

The object of the invention is to provide means for releasing the driving mechanism, or a portion thereof, when an undue strain comes upon the driven mechanism so that the driving mechanism may be permitted to revolve while the driven portion of the mechanism is allowed to stop.

My invention consists in the various constructions and combinations of parts hereinafter described and set forth in the claims.

In the accompanying drawings, Figure 1, is a sectional elevation view of a portion of a driving mechanism embodying my invention. Fig. 2, is a side elevation view of the same. Fig. 3, is a perspective view of a portion of the clutch in detail. Fig. 4, is an end view of the collar or holding disk in detail, hereinafter referred to.

Like parts are indicated by similar letters of reference throughout the several views.

In the said drawings, A, represents a shaft to which power is to be applied.

B, is a pulley on which is placed a belt adapted to transmit the power to said shaft, A. This pulley B, is mounted upon a sleeve, C, which in turn is mounted loosely upon the shaft A. The pulley B, is connected to the sleeve C, through the medium of friction bearing blocks, D, each provided with tension screws, $a$, and suitable lock-nuts, $a'$, by means of which the tension or pressure of the friction blocks on the sleeve, C, may be regulated or adjusted as desired. Three of the friction-blocks, D, are preferably used placed at intervals about the hub, B', as shown in Fig. 2. The sleeve, C, is provided at one end with a flanged portion or collar, C', which bears against one end of the hub B' of the pulley, B. The other end of the sleeve, C, is provided with a series of clutch faces, $b$, adapted to engage with a similar series of clutch-faces, $d$, in a clutch-collar, E, pinned or otherwise secured to the shaft, A. These clutch-faces, $b$ and $d$, in the sleeve and collar E, respectively, are formed on one side with beveled faces in the nature of ratchet teeth; the driving side of the said clutches being placed in the direction in which the pulley, B, revolves. The sleeve, C, is held against the clutch-collar, E, by a spring, F, located about the shaft, A, between the end of the sleeve, C, and a collar, G, also pinned or otherwise rigidly secured to the shaft, A. The clutch-faces on the respective parts C and E, are thus held firmly in engagement, and as the pulley B, is revolved, the sleeve, C, is turned therewith through the medium of the friction-blocks, D, and the shaft, A, is normally revolved from the sleeve, C, through the medium of the clutches on said sleeve and on the collar, E.

Located on one end of the hub, B', of the pulley, B, is a series of clutch-faces, $c$, similar to those, $b$, upon the sleeve, C, but facing in the opposite direction. The collar, E, is also provided with a corresponding set of clutch-faces, $e$, engaging with the clutches upon the end of the hub, B'. As before stated, the flange or collar, C', at the end of the sleeve, C, rests against the free end of the hub, B', so that all the parts are held firmly together by means of the spring, F.

Pivoted to the hub, B', and extending outwardly so as to engage with a flanged portion, G', on the collar G, are clutch-dogs, $f$, two of which are shown in the drawings, though any desired number may be employed. Means are provided for forcing these dogs into contact with the periphery of the flange, G', springs, $f'$, being shown in the drawings as employed for this purpose.

As before stated, a revolution of the pulley, B, through the medium of the friction-blocks and the clutches, as described, causes a revolution of the shaft, A. In the event, however, that an undue strain should come upon the shaft, A, sufficient to cause the friction-blocks to slip upon the sleeve, C, the said pulley and sleeve are caused to revolve at different speeds and this difference in speed will, by reason of the clutch-faces, $c$ and $e$, on the pulley B, and collar, E, respectively, running in an opposite direction from that in which the pulley revolves, cause said pulley to move longitudinally along the shaft, A, from the collar, E. This movement of the pulley, B, by reason of the flange, C', on the sleeve, C, will cause the said sleeve also to move longitudinally upon the shaft compressing the spring, F, until the driving clutches, b and d, on the sleeve and clutch-collar, respectively, are out of engagement; at the same time, the clutch-dogs, f, will be moved outwardly sufficiently to engage over the flange, G', and thus hold the respective clutches out of engagement so that the pulley, B, and the sleeve, C, may revolve freely upon the shaft, A, while said shaft remains at rest.

I have shown and described this device in connection with a pulley to which the driving power is attached. It is evident that it may be modified to operate in connection with gearing or any other form of driving mechanism with the pulley or wheel as driver and the shaft driven, or vice versa. It is evident, also, that the other parts of the device may be variously modified to suit the different mechanisms with which it may be employed without departing from the spirit of my invention. I do not, therefore, limit myself to the specific constructions shown and described, but

I claim as my invention—

1. The combination, with a shaft to be driven, of a sleeve thereon, and a wheel on said sleeve, said sleeve being detachably connected to said shaft, means whereby the connection between the sleeve and the shaft may be positively broken by a movement of said wheel on said sleeve, and means for yieldingly connecting said wheel and sleeve so as to permit such relative rotative movement of these parts, substantially as specified.

2. In a safety device for driving mechanism, a wheel mounted upon a sleeve, the hub of said wheel and said sleeve being each provided with inclined clutch-faces running in opposite directions, a clutch-collar having corresponding clutch-faces to engage with said wheel and sleeve, and means for yieldingly connecting said sleeve and wheel, substantially as specified.

3. The combination, with a shaft, and a clutch collar secured rigidly to said shaft, of a sleeve having inclined clutch-faces engaging with said clutch-collar, a wheel on said sleeve having clutch faces oppositely inclined from the clutch-faces on said sleeve, and also engaging with said clutch-collar, friction bearings between said wheel and sleeve, and means for holding said sleeve and wheel into engagement with said clutch-collar, substantially as specified.

4. The combination, with a shaft, and a clutch-collar secured rigidly to said shaft, said clutch-collar being provided with two series of clutch-faces inclined in opposite directions, of a sleeve on said shaft and a wheel on said sleeve, clutch-faces on the wheel and sleeve, respectively, adapted to engage with the respective clutches on the said clutch-collar, means for yieldingly connecting said sleeve and wheel, and means for holding said sleeve and wheel yieldingly in contact with said clutch-collar, substantially as specified.

5. The combination, with a shaft and clutch-collar thereon, said clutch-collar being provided with two series of clutch-faces inclined in opposite directions, of a sleeve on said shaft and a wheel on said sleeve, said sleeve and wheel being each provided with clutch-faces adapted to engage with the respective clutch-faces on said clutch-collar, friction-bearings between said sleeve and wheel, and means for holding said clutch-faces out of engagement when separated by the turning of said wheel upon said sleeve, substantially as specified.

6. The combination, with a shaft and clutch-collar thereon having two series of clutches with oppositely inclined faces, of a wheel and sleeve provided with clutch-faces adapted to engage with the respective series on said clutch-collar, means for yieldingly connecting said wheel to said sleeve, a spring for forcing said wheel and said sleeve into engagement with said clutches, and means for holding said clutches out of engagement when disconnected by a difference in the speed of said wheel and sleeve, substantially as specified.

7. The combination, with a shaft and a clutch-collar secured rigidly thereon having two series of oppositely inclined clutch-teeth or faces, of a sleeve and pulley each provided with clutch faces to engage with the respective clutches of said clutch-collar, friction bearings between said sleeve and pulley, a collar on said shaft, a spring between said sleeve and collar, and clutch-dogs on said pulley adapted to engage with said collar when said pulley is moved longitudinally on said shaft, substantially as specified.

In testimony whereof I have hereunto set my hand this 24th day of August, A. D. 1889.

ELMORE W. ROSS.

Witnesses:
CHAS. L. WHEATON,
T. W. CRANE.